Patented Dec. 25, 1934

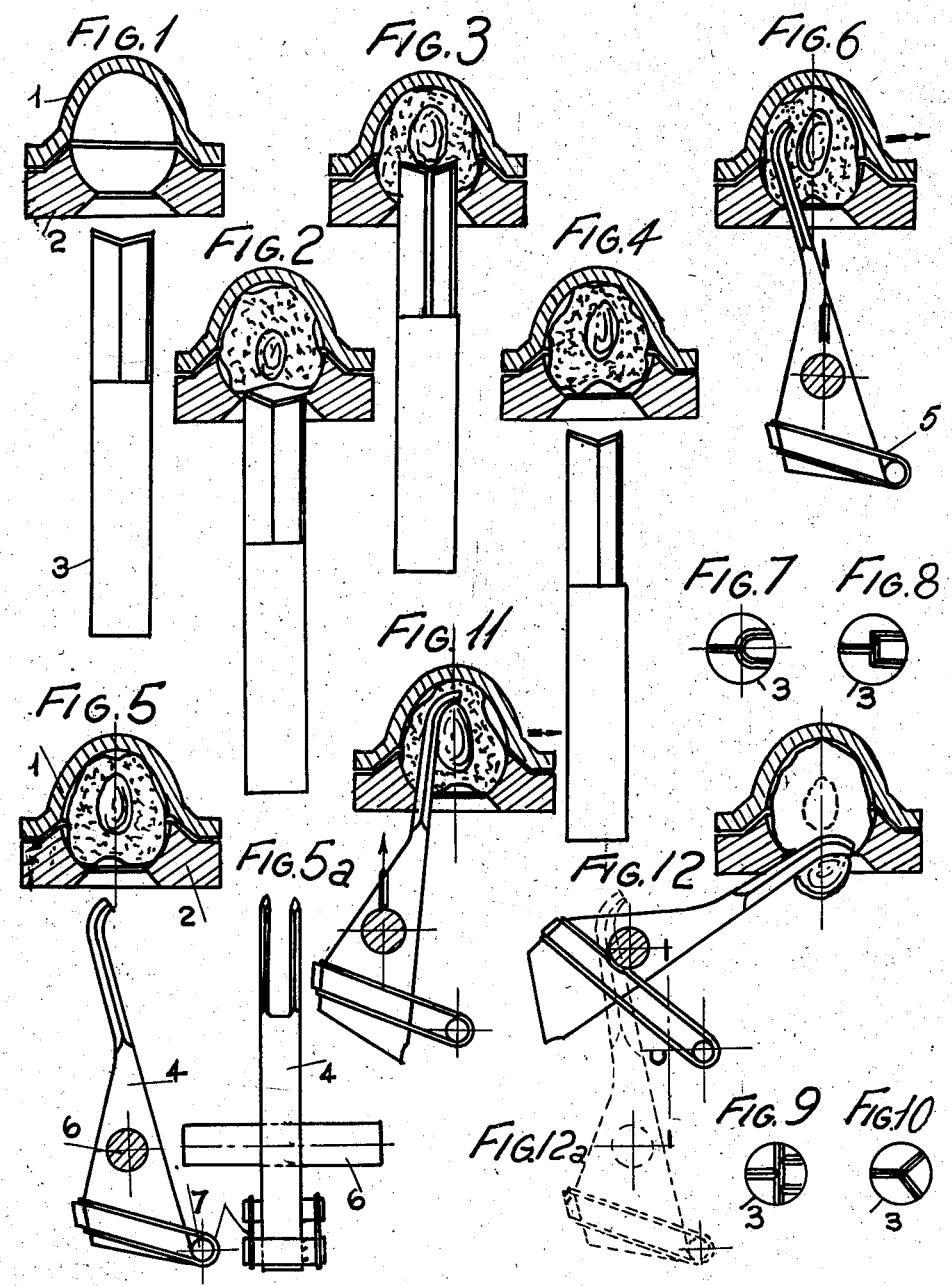

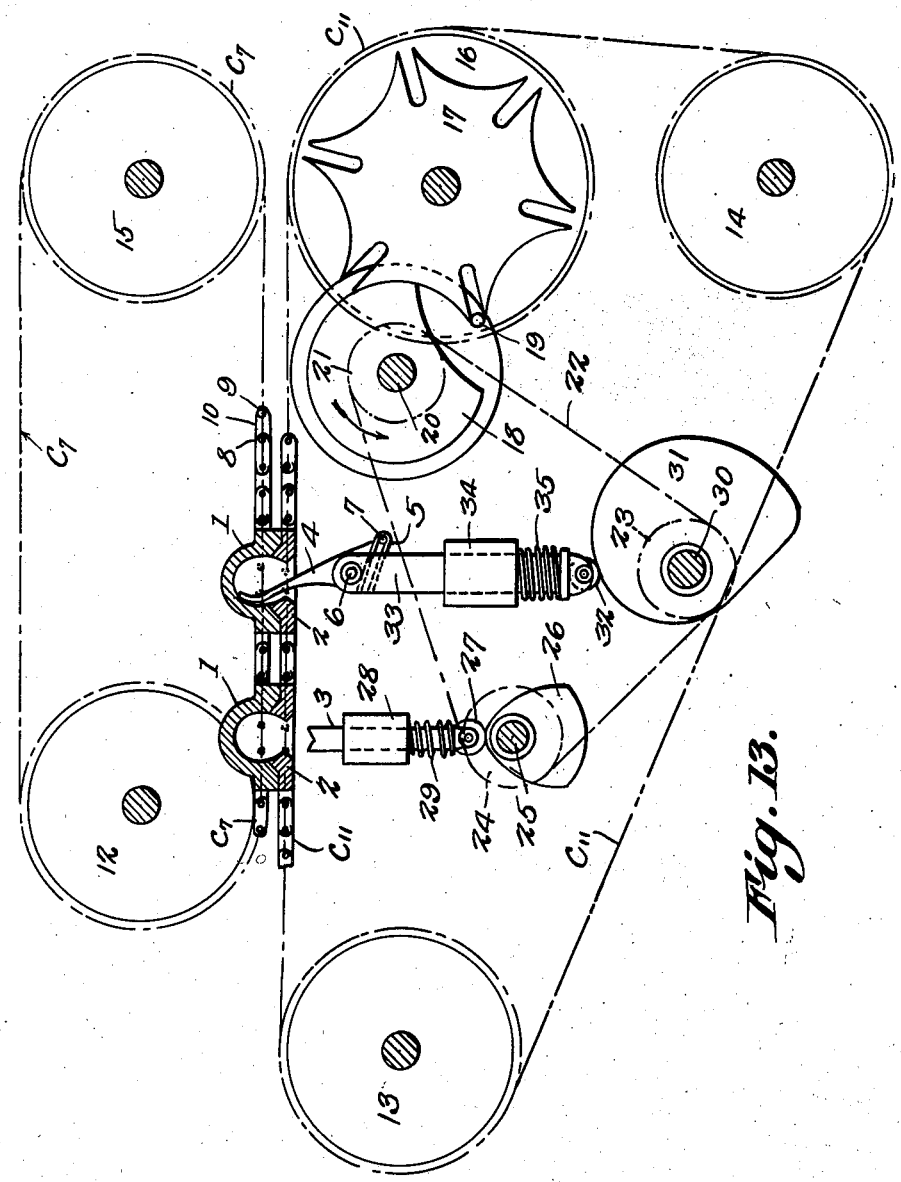

1,985,336

UNITED STATES PATENT OFFICE 1,985,336

FRUIT PITTING MACHINE

Robert Chapelle, Beaucaire, Gard, France

Application February 17, 1933, Serial No. 657,309
In France February 22, 1932

1 Claim. (Cl. 146—18)

This invention relates to improvements in fruit pitting machines, the object of the invention being to provide an improved machine of this kind which is automatic in operation, is simple in construction and which is effective for removing the pits of fruit such as cherries, plums, peaches and the like, and consists in the construction, combination and arrangement of devices hereinafter described and claimed.

In the accompanying drawings:

Figure 1 is a detail section of one of the fruit holders and of the knife which cooperates therewith, the knife being shown in lowered position.

Figure 2 is a similar view of the same with the knife in somewhat raised position and entering the base of the fruit holder.

Figure 3 is a similar view of the same with the knife in maximum raised position.

Figure 4 is a similar view with the knife in lowered position after having cut through the fruit to the pit.

Figure 5 is a similar view of the holder in association with the pit extracting fork and showing the fork in initial position.

Figure 5a is a detail elevation of the fork at right angles to Figure 5.

Figure 6 is a view similar to Figure 5 and showing the fork in somewhat raised position.

Figure 7 is a detail plan of one form of the knife.

Figure 8 is a similar view of another form of the knife.

Figure 9 is a similar view of another form of the knife.

Figure 10 is a similar view of another form of the knife.

Figure 11 is a detail elevation partly in section similar to Figure 6 and showing the fork in engaged position with the fruit pit and at the upper limit of its vertical movement.

Figure 12 is a similar view showing the fork at the downward limit of its stroke and removing the pit from the fruit.

Figure 12a is a detail elevation in dotted lines of the fork and showing the same in its lower position and at the beginning of its pit removing stroke.

Figure 13 is a diagrammatic elevation partly in section of the complete machine.

In the embodiment of my invention I provide a suitable number of fruit holders each of which comprises a base 2 and a cap 1. The cap is detachably fitted on the base and together with the base is provided with a chamber 1a of a size and shape adapted to receive the fruit to be pitted. The base also has an opening 2a at the bottom of said chamber and affording access thereto by a knife 3 and by a pit removing fork 4.

The caps of the fruit holders are carried by and secured to an endless chain $C^7$ which connects a pair of chain wheels or pulleys 12, 15 as shown in Figure 13. The bases 2 of the fruit holders are connected to and carried by an endless chain $C^{11}$, which chain engages wheels or pulleys 13, 14, 16.

It will be understood that when the opposing leads of the chains are moved in the direction indicated by the arrow $a$ the caps are closed on the bases of the fruit holders and that as each fruit holder passes from between the wheels or pulleys 15, 16 the cap is moved upwardly from the base and the base is moved downwardly so that the fruit in the chamber of the fruit holder and which by this time has been pitted is ejected from between the base and cap.

On the same shaft with the wheel or pulley 16 is a Geneva gear 17, the radial slots of which are engaged by the stud 19 of the gear member 18 which coacts with the member 17 and is arranged on the shaft 20. On said shaft is also a chain wheel or pulley 21 which is engaged by an endless chain or belt 22 which also engages a wheel or pulley 23 on a shaft 30 and a wheel or pulley 24 on a shaft 25. The shaft 30 is provided with a cam 31 for operating the fork 4 and the shaft 25 has a cam 26 for operating the knife 3. The knife is movable vertically, operates in a suitable guide 28 by which it is held in position and is provided at its lower end with a roller 27 which bears on the periphery of the cam 26. A spring 29 is provided which imparts down stroke to the knife, so as to keep it normally clear of the fruit holders.

The chains $C^7$ and $C^{11}$ which encircle the pinions 12, 13, 14, 15 receive their movement through the pinion 16 fast with the Geneva gear 17 which is actuated by the rotary spur 19 of the disc 18 which receives the movement of the motor. The shaft 10 on which the disc 18 is mounted also carries a pinion 21 which actuates the pinions 23 and 24 by means of the chain 22. The pinion 24 causes the shaft 25 to rotate, the latter being fast with the cam 26. The latter causes the knife 3 to rise and to lower by means of the roller 27, the knife sliding in the guide 28 drawn toward the cam by the spring 29. The pinion 23 causes the shaft 30 to rotate, the latter being fast with the cam 31 which by means of the roller 32 causes the extractor fork 33 to rise and descend. Said fork 33 slides in the guide 34 and is drawn on the cam by means of the spring 35. The fork 33 receives the extractor fork 4 which is pivoted about the axis 6 and is drawn by the spring 5 against the abutment 7 forming part of the little fork 33.

In the operation of this machine the Geneva gear 17 causes the chains of the fruit holder bases and caps to advance in accordance with the rotation of the shaft 20, an advance which represents a pitting or seed removing operation as has been stated.

The specific means disclosed in Figure 13 for operating the conveyors and raising and lowering the knife and pitting fork form no part of the present invention.

Having thus described my invention, I claim:

In a fruit pitting machine, a chain having a socket therein with an opening in the bottom thereof, a cap cooperating with the upper edge of the socket to form a pocket for a fruit to be pitted, means for moving the pocket in a predetermined path, a knife and pitting fork mounted in spaced relation below the path of movement of the pocket and in the same plane, means for vertically moving the knife into the pocket in one position thereof to slit the fruit therein, means for pivotally mounting the fork on a fixed vertically movable member, said pivoting means permitting the fork to swing longitudinally of the path of movement of the pocket, spring means for maintaining the fork pivoted in a vertical position, means for moving the pocket from the position above the knife to a position above the fork, means for moving the fork into the pocket and fruit contained therein, means for advancing the pocket along the predetermined path while maintaining the fork in the pocket and thereby rotating the fork on its pivot against the action of the spring, and means for thereafter returning the fork to initial position.

ROBERT CHAPELLE.